J. W. BROKAW.
Harvester Rake.

No. 20,017.

2 Sheets—Sheet 2.

Patented April 20, 1858.

UNITED STATES PATENT OFFICE.

J. W. BROKAW, OF SPRINGFIELD, OHIO, ASSIGNOR TO WARDER, BROKAW & CHILD, OF SAME PLACE.

IMPROVEMENT IN REAPING-MACHINES.

Specification forming part of Letters Patent No. 20,017, dated April 20, 1858.

*To all whom it may concern:*

Be it known that I, JOHN W. BROKAW, of Springfield, in the county of Clarke and State of Ohio, have invented a new and useful Improvement in Reaping-Machines, of which the following is a full, clear, and exact description, reference being had to the accompanying drawings, making part of this specification, in which—

Figure 1:
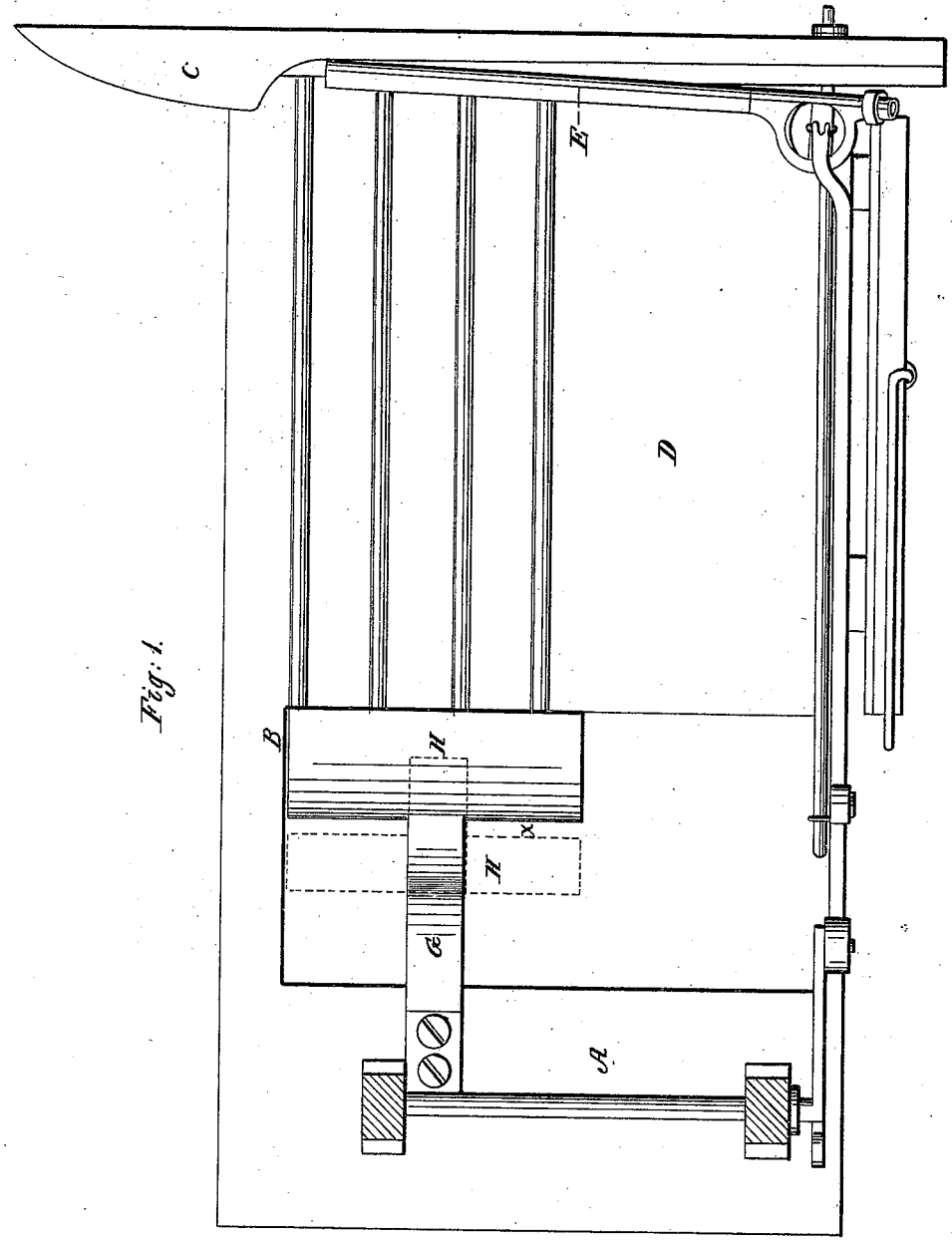
Figure 2:
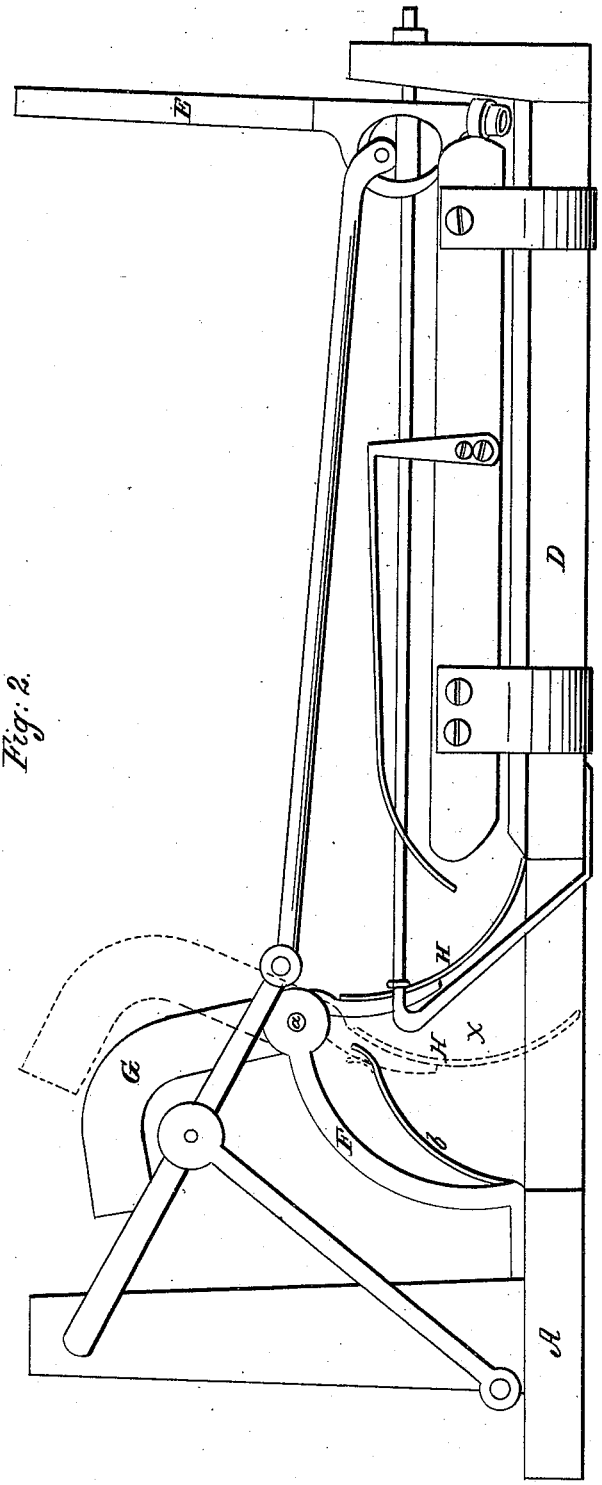

Figure 1 represents a plan of that portion of a harvesting-machine to which my present improvement is applied, and Fig. 2 a rear elevation of the same.

In the use of reaping-machines it is practically of great importance that the grain, as it is raked off the platform, should be deposited at once in compact gavels upon the ground, as much time and labor will be saved thereby, which would otherwise be wasted in raking the grain together on the ground preparatory to binding. Different means have been devised to effect this object, but mostly of a complicated nature, many of them involving an additional consumption of motive power to operate them. Moreover, the usual mode of applying and arranging these devices causes the machine to lose much of its primitive simplicity and compactness—points absolutely essential to the successful operation of this class of machines.

The object of my present improvement is to provide, arrange, and apply suitable means for effecting this object in a simple and effectual manner; and it consists in arranging in the space between the frame of the driving-wheel and the platform commonly used in harvesting grain an auxiliary platform of peculiar construction and operation, whereby the grain, as it is raked from the platform upon it, will be deposited automatically by its own weight in compact gavels upon the ground out of the track of the horses in the return-swath.

To enable others skilled in the art to make, construct, and use my improvement, I will now proceed to describe it in detail, omitting to describe such parts of the machine as are not essential to the full understanding of my present improvement.

In the accompanying drawings, A represents the inner side of the frame of the driving-wheel, (not represented,) on which the parts that operate the rake E are supported; B, the finger-bar for the support of the cutting apparatus, (not represented;) C, the divider for the separation of the grain to be cut from that to be left standing, and D the platform for the reception of the grain as it is cut. Immediately in rear of the inner end of the finger-bar, between the frame A of the driving-wheel and the platform D, a free space, X, is left, through which the grain is to be deposited as it is raked off the platform D by the rake E.

On the side of the frame A next the space X, and near the finger-bar B, is secured a standard, F, having a forked head, $a$, between and to which is pivoted a weighted lever, G, in the manner of a hinged joint, to the lower end of which is secured a receiving-apron or auxiliary platform, H. The upper end of this lever is so weighted as to maintain the lower end of the auxiliary platform H against the under side of the platform D until a sufficient quantity of grain to form a gavel has been thrown or collected upon it from the platform D by the rake E, when the weight of the grain will force it back a sufficient distance to allow the grain to drop upon the ground in a neat and compact bundle, thus preventing scattering of the grain in raking in a simple and effective manner.

To prevent any tendency of the auxiliary platform H to remain in a vertical position on being forced back by the weight of the accumulated grain, a spring, $b$, is arranged in rear of the apron or platform H, so as to give to it the necessary recoil to bring the weight of the lever again in play.

The spring $b$ may be secured to the standard F; or it may be arranged to act in the same way in any other suitable manner.

By such an arrangement of my automatic auxiliary platform it will be seen that it neither renders the machine too complicated for successful use, nor does it consume its motive power so as to render it inoperative in practical use; but, on the contrary, where the raking is done by hand, it will be of incalculable assistance to the raker, inasmuch as it will enable him to attend more to the keeping of the platform clear than to laying the grain neatly and compactly upon the ground.

Having thus described my improvement, what I claim as new, and desire to secure by Letters Patent, is—

The combination of an auxiliary platform, H, with the platform for the reception of the grain as it is cut, when arranged, constructed, and operated in a space between the latter and the driving-wheel, in the manner substantially as and for the purposes set forth.

In testimony whereof I have hereunto set my hand this 29th day of October, A. D. 1857.

J. W. BROKAW.

Witnesses:
P. HANNAY,
W. LEWIS.